US007959278B2

(12) United States Patent
Regan et al.

(10) Patent No.: US 7,959,278 B2

(45) Date of Patent: Jun. 14, 2011

(54) METHOD AND APPARATUS FOR INK JET PRINTING ON PATTERNED SUBSTRATE

(75) Inventors: Michael T. Regan, Fairport, NY (US); Donald S. Rimai, Webster, NY (US); Robert E. Zeman, Webster, NY (US); Maria Cristina Barbosa DeJesus, Fairport, NY (US); David Daniel Putnam, Fairport, NY (US); Thomas N. Tombs, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 540 days.

(21) Appl. No.: 11/446,467

(22) Filed: Jun. 2, 2006

(65) Prior Publication Data

US 2007/0279469 A1 Dec. 6, 2007

(51) Int. Cl.
*C09D 11/00* (2006.01)

(52) U.S. Cl. .................... 347/100; 106/31.13; 106/31.92

(58) Field of Classification Search .................... 347/16, 347/100, 102, 103, 107, 112, 153, 154; 106/31.13, 106/31.92

See application file for complete search history.

(56) References Cited

U.S. PATENT DOCUMENTS

| | | | | |
|---|---|---|---|---|
| 5,296,898 | A * | 3/1994 | Rubin et al. | 347/129 |
| 5,539,440 | A * | 7/1996 | Higuchi et al. | 347/112 |
| 5,841,456 | A * | 11/1998 | Takei et al. | 347/103 |
| 6,481,840 | B1 * | 11/2002 | Mueller et al. | 347/88 |
| 2003/0066751 | A1 | 4/2003 | May et al. | |
| 2003/0067528 | A1 * | 4/2003 | Chowdry et al. | 347/103 |
| 2003/0067529 | A1 * | 4/2003 | May et al. | 347/103 |
| 2003/0227503 | A1 | 12/2003 | Klausbruckner | |
| 2004/0183860 | A1 * | 9/2004 | Furukawa | 347/55 |
| 2006/0001722 | A1 | 1/2006 | Stelter et al. | |

FOREIGN PATENT DOCUMENTS

| | | |
|---|---|---|
| EP | 0 561 419 A | 9/1993 |

* cited by examiner

*Primary Examiner* — Laura E Martin

(74) *Attorney, Agent, or Firm* — William R. Zimmerli

(57) ABSTRACT

Method and apparatus for printing an image-wise ink pattern on a receiver. A primary imaging member includes a series of substantially equal-sized cells located over the substrate surface thereof. The primary imaging member has an electrically conductive layer. An ink jet printhead selectively ejects drops of ink into the primary imaging member cells in a desired image-wise ink pattern. The image-wise ink on the primary imaging member is fractionated to separate the liquid in the ink. A receiver is transported into operative association with the primary imaging member, and a transfer mechanism applies a pressure between the receiver and the primary imaging member, and establishes an electrostatic field to transfer the image-wise ink pattern to the receiver.

23 Claims, 5 Drawing Sheets

METHOD AND APPARATUS FOR INK JET PRINTING ON PATTERNED SUBSTRATE

FIELD OF THE INVENTION

This invention relates in general to image printing in an apparatus including an ink jet printing device, and more particularly to ink jet printing with solvent based inks deposited onto a patterned substrate.

BACKGROUND OF THE INVENTION

It is well recognized that the graphic arts printing market desires, at this time, a high-speed digital press. A digital press that begins to match the speed, image quality, and per print costs of conventional printing presses would complement the digital nature of information and enable variable data printing. Several electrophotographic-based engines exist today, with both dry and liquid toning systems. The dry toning systems suffer from image relief, limited process width, generally high print costs, low process speed, and high process complexity. The liquid based systems suffer from limited process width, and a complex process, which requires sophisticated operation.

Ink jet printing has been touted as a technology of choice for digital printing, but also has several problems. Even assuming the successful development of full-width printheads, aqueous-based ink jet inks, being approximately 95% water, struggle to achieve high densities in a single pass, soak the receiver (e.g., paper) inducing cockle and additional drying costs, and are subject to coalescence problems, worsened by the full-width, single-pass printing mode required to achieve press-like throughput.

The problem of coalescence is particularly troublesome when attempting high speed printing via ink jet. If ink drops on the receiver touch one another, surface tension causes them to pool into a blob, destroying the spatial integrity of the image. Several patents have addressed the problem, if even as a means to solve other problems, by jetting onto patterned surfaces. U.S. Pat. No. 6,109,746 (Jeanmaire et al.), jets onto a patterned surface; as does U.S. Pat. No. 6,443,571 (Shinkoda et al.); and U.S. Pat. No. 6,648,470 (Korem). All of these systems are aqueous based, however, and retain the density problem and add a new one: residual colorant left in the cellular structure from incomplete transfer.

Transferring ink from the cell of a patterned surface to a receiver is akin to conventional transfer in, say, a gravure printing press. Press inks transfer at 50-60% efficiency, but the residual ink is simply refreshed (the cell is refilled) and the same image printed again in register (to the other colors). A digital press, however, with fully variable printing capability, requires that each image be potentially different and thus cleaning or removal of the residual ink is required. Assuming one could clean the cells of the residual ink (a very difficult task at high speed), one could not simply discard it, since this would essentially double the ink costs of printing, a generally unattractive proposal for printers.

It is the object of this invention to provide a process that enables fully variably digital printing at high speeds while simultaneously overcoming the problems of coalescence, adequate single-pass density, excessive water volume on the receiver, and residual colorant in the cells of a patterned ink-receiving surface.

SUMMERY OF THE INVENTION

This invention is directed to a digital printing press that can be made using a combination of electrophotographic and ink jet technologies. This can be done by jetting a specially formulated ink, of micrometer or sub-micrometer size, electrically charged marking particles dispersed in an electrically insulating solvent onto a primary imaging member. The ink is jetted image-wise into substantially equal-size cells forming a biasable patterned substrate (e.g., a uniformly patterned gravure or anilox roller) for the primary imaging member. The primary imaging member is subsequently merged with a receiver (e.g., paper or an intermediate), and an electrical voltage is applied across this merged nip to urge the marking particles from the cells of the primary member to the receiver so that an image is obtained on the receiver. Substantially all of the colorant moves to the receiver, leaving only the clear solvent in the cells, which is easily cleansed and/or evaporated. The cellular structure prevents coalescence, the ink colorant concentration provides adequate single-pass density, paper receiver emerges from the nip almost dry, and the process may be carried out at high speed.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Figure 1:
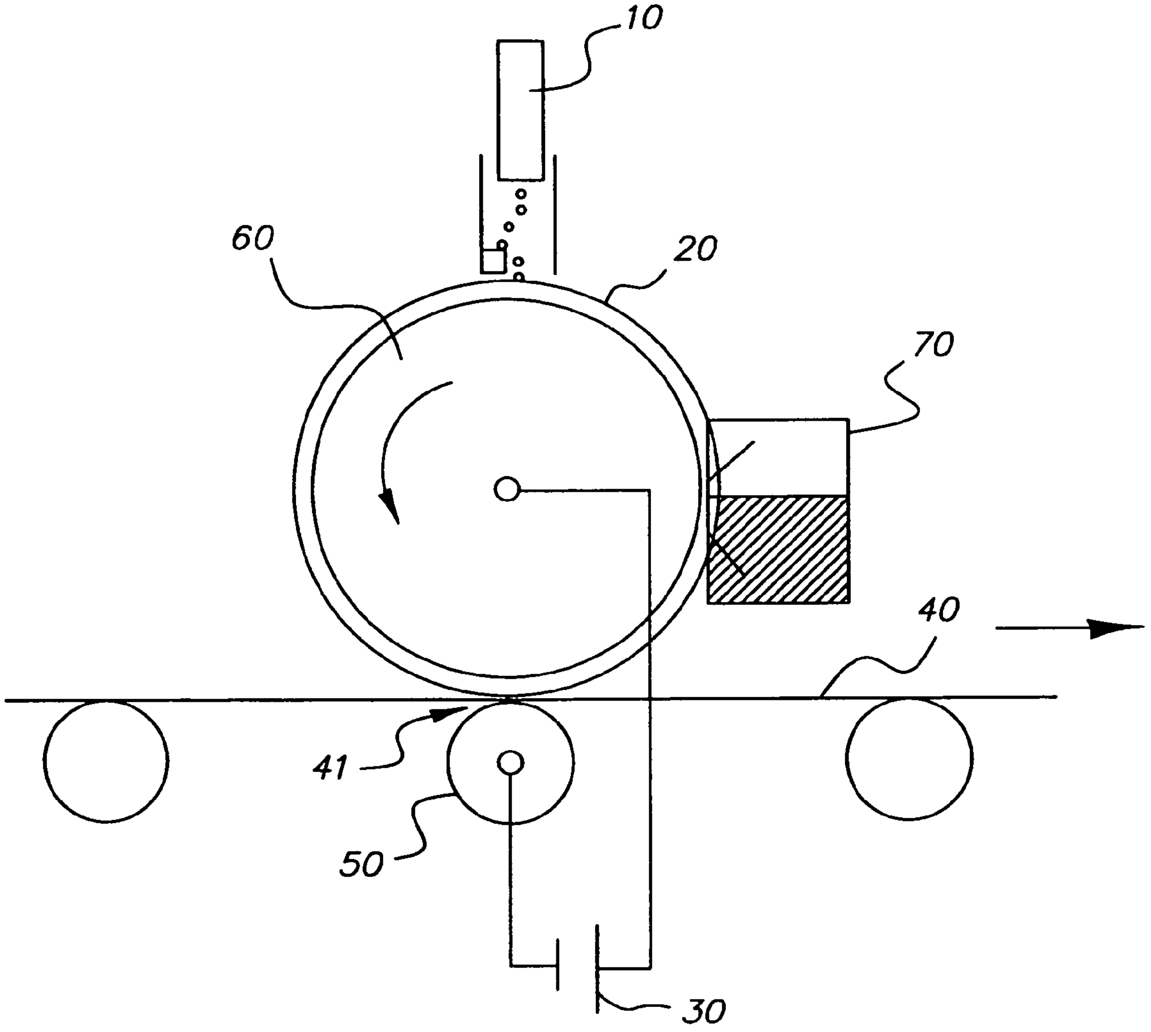
FIG. 1 is a schematic view of a printing apparatus according to this invention including an ink jet device, a patterned roller and a biased transfer roller that presses a receiver against the patterned roller.

The subject invention will now be more particularly described with reference to the accompanying drawings. In the mode of operation according to the invention, the aforementioned ink is jetted from an ink jet printhead 10 into just those cells of a patterned uniform series of equal-sized cells (see FIG. 2) on a substrate 20 (described more fully below) for a primary imaging member 60 that defines the image to be printed. In one embodiment of this invention, the image is then transferred to the receiver 40 (e.g., paper) by pressing the receiver into contact with the image-bearing primary imaging member 60 and applying an electric field that urges the marking particles in the ink in the cells of the patterned substrate 20 towards the receiver (see FIG. 1). In this manner, most, if not virtually all, of the marking particles will be transferred to the receiver, leaving behind clear ink solvent. Thus, most of the solvent never soaks into the receiver and the concentrated ink, resulting from this process, is sufficiently viscous so as to preclude running on the surface of high quality paper receivers. This concentrates the colorant to the surface of the receiver, and allows high-density images to be achieved as well. The primary imaging member 60 can then be cleaned, if desired, using known methods. It should be noted that the high efficiency of this mode of transfer allows virtually all the marking particles to be transferred thereby minimizing the formation of ghost images.

To practice this invention, an electric field must be established between the primary imaging member 60 and the receiver 40. This can be done using known methods. For example, a difference of potential can be established between the primary imaging member 60 and a pressure roller 50 by a voltage source 30. Alternatively, a difference of potential can be established between the primary imaging roller 60 and an electrically conducting transport web, with the receiver sandwiched between the two aforementioned members.

In one preferred embodiment of this invention, the primary imaging member 60 includes a noncompliant material with high electrical conductivity. Suitable materials include nickel, stainless steel, and aluminum. If desired, the primary imaging member can be over-coated with a thin layer of a low surface energy material such as various fluorinated hydrocarbon polymers including Teflon, various silicones, or salts of fatty acids such as zinc stearate, for example. These materials can serve to enhance release of the ink while minimizing the spreading of the ink droplets. When practicing the mode of the invention with a material with a high electrical conductivity, it is preferable to establish the electrical field by applying a voltage from source 30 of between 100 volts and 1,000 volts. Lower voltages may not be able to transfer all the marking particles within the ink droplets. Higher voltages may result in electrostatic discharge. In this mode of operation, in order to enable the transferred image-wise ink pattern to have a high resolution., the preferable screen frequency of the uniform series of cells is between 140 to 1,200 lines per inch (lpi), and more preferably between 400 and 800 lpi. The preferred geometry of the primary imaging member is a cylinder.

In an alternative preferred mode of operation for this invention, the primary imaging member 60 includes an electrically conductive member such as an aluminum, nickel, or stainless steel roller, sleeve, or plate that is covered with a ceramic material. The ceramic material can be electrically conductive or electrically insulating. A uniform series of cells as previously mentioned is then produced in or through the ceramic layer by known means, such as laser ablation, for example. In the case of an electrically insulating ceramic, the thickness of the ceramic, especially at the bottom of each cell, must be sufficiently thin as to allow a sufficiently strong electric field to be produced across the ink to permit fractionation of the ink and transfer of the marking particles.

In another alternative preferred mode of operation, the primary imaging member 60 includes a compliant material such as an elastomer. Suitable elastomers are polyurethane, silicones, or natural and artificial rubbers, for example. The elastomer selected should not be subject to being dissolved in, or plasticized by, the ink. The elastomer also should not significantly swell when immersed in ink solvent. This primary imaging member 60 should also have a suitable charge agent, as are know in the literature, so that the electrical resistivity of the primary imaging member is less that $10^{11}$ Ω-cm, and preferably less that $10^{10}$ Ω-cm. The primary imaging member 60 can also have a thin coating or layer of a material to control adhesion, such as a fluorinated hydrocarbon including Teflon, various silicones, or salts of fatty acids such as zinc stearate, for example. The primary imaging member 60 can also include a thin layer (less than 50 μm thick) of a relatively hard material (i.e. a material having a Young's modulus greater than $10^8$ Pa). Suitable materials include various creamers, leathery or glass polymers, or refractory materials such as diamond-like carbon, SiC, $SiO_2$, for example. When practicing this mode of the invention, the applied voltage used to generate the aforementioned electrostatic field should be greater than 300 volts and less than 3,000 volts. It is preferable that, in this embodiment of the invention, the primary imaging member 60 includes a compliant layer not less than 0.1 mm thick and preferably at least 1.0 mm thick. This layer should have a Young's modulus of between 1.0 MPa and 10.0 MPa, as determined by measuring the stress-strain curve in tension using a device such as an Instron Tensil Tester and extrapolating back to zero strain. It is also preferable that this same layer have a Poisson's ratio between 0.4 and 0.5.

When practicing this mode of the invention, it is desirable that the uniform series of cells be arranged in a pattern having a periodicity corresponding between 30 and 400 lpi, although higher values of the periodicity, i.e. more than 400 lpi, are acceptable if such a member can be produced with sufficient cell size and shape uniformity.

The ink used in this invention is not a conventional ink jet ink. Rather, the ink comprises marking particles suspended in an electrically insulating solvent, as described in co-pending U.S. Patent Application Publication No. 2007/0279472 A1, and whose description is incorporated herein by reference.

Figure 2:
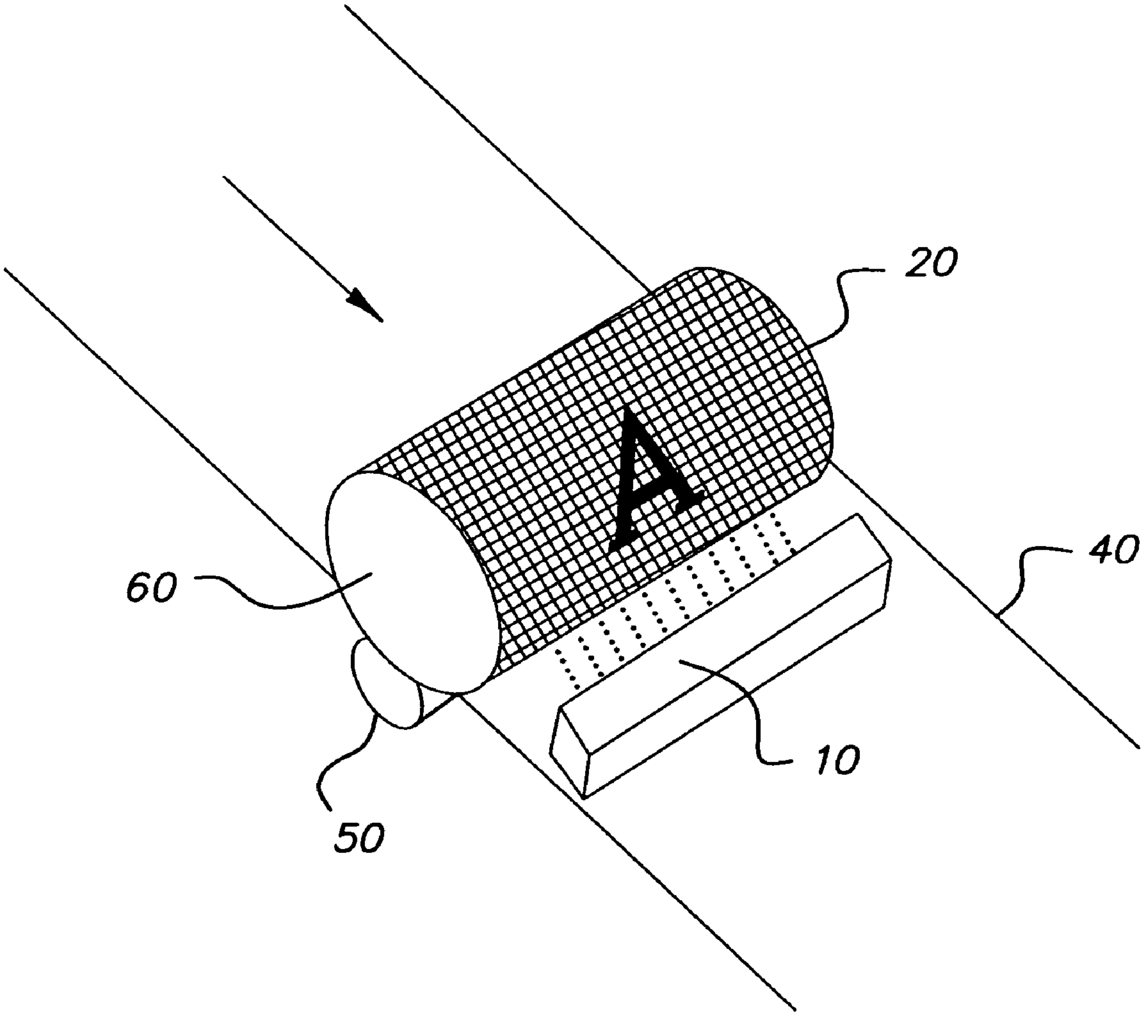
FIG. 2 is a perspective drawing of part of the apparatus in FIG. 1 with indication of the patterned array on the image-receiving surface of the patterned roller.

In one preferred mode of operation, the image is transferred to a final image-bearing member (receiver) such as paper. This is illustrated in FIGS. 1 and 2. The electrographic ink is jetted from a full-width ink jet head 10 onto a uniform series of cells on a patterned surface 20 (e.g., a gravure or anilox roller) of the primary imaging member 60 in an image-wise manner. In this mode of operation, as noted above, the preferred cell (screen) frequency of the patterned surface is between 140 and 1,200 lpi, more preferably between 400 and 800 lpi. The image receiving uniform cell patterned surface 20 is a non-compliant material with high electrical conductivity. Suitable materials include nickel, chrome-plated steel, and aluminum. If desired, the primary imaging member 60 can be over-coated with a thin layer of a low surface energy material such as various fluorinated hydrocarbon polymers, including Teflon, various silicones, or salts of fatty acids such as zinc stearate, for example. This material can serve to enhance release of the ink while minimizing the spreading of the ink droplets. Pressure roller 50 is a conducting back-up roller, which may be biased relative to the primary imaging member 60. When practicing this first mode of the invention, it is necessary to establish an electrical transfer field by applying a voltage from source 30 across the receiver nip 41, preferably of between 100 volts and 2,000 volts. Lower voltages may not be able to transfer all the marking particles from the cells, while higher voltages may result in electrostatic discharge. Preferred voltage depends on the dielectric properties of the materials of the receiver 40, and may be experimentally determined. The preferred geometry of the primary imaging member is a cylinder. A cleaning subsystem 70 for the primary imaging member 60 may also be included.

In order to use electrostatic transfer, the inks must include electrically charged marking particles such as those described in co-pending U.S. Patent Application Publication No. 2007/0279472 A1. Moreover, the ink should be electrically insulating, i.e., it should have an electrical resistivity greater than $10^{10}$ Ω-cm, and preferably greater than $10^{12}$ Ω-cm, as determined using the method described in the same co-pending U.S. Patent Application.

Figure 3:
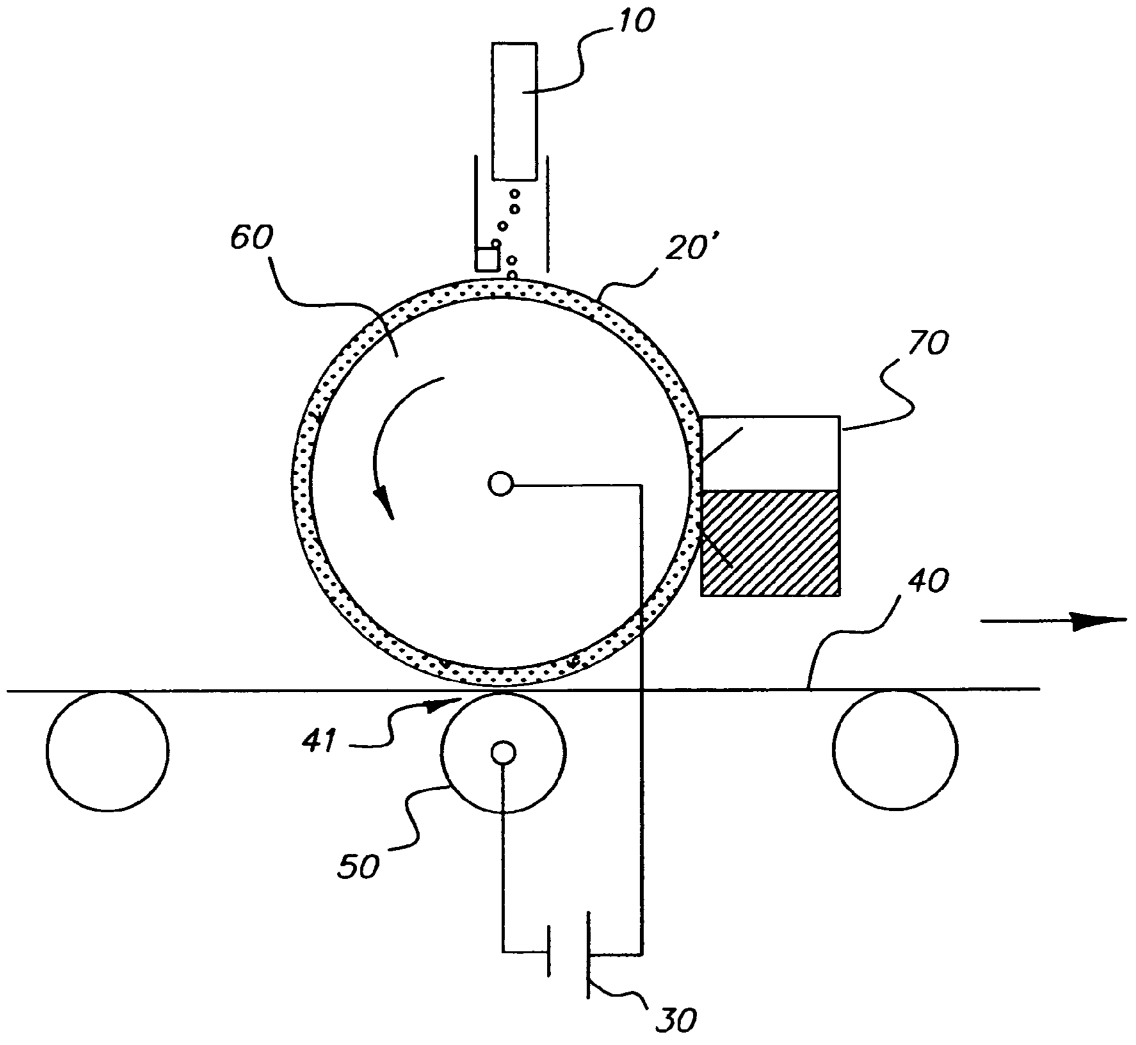
FIG. 3 is a schematic view of an alternate embodiment of the printing apparatus according to this invention in which the patterned image-receiving surface is an electrically conducting compliant elastomer.

In another preferred mode of operation, the primary imaging member 60 has a compliant textured layer 20' (see FIG. 3).

The primary imaging member 60 has a compliant material covering, such as an elastomer, which may be cast with a patterned surface forming the textured layer 20'. Suitable elastomers include polyurethane, silicones, or natural and artificial rubbers, for example. The elastomer should not dissolve in or be plasticized by the ink, nor should it significantly swell when immersed in the ink solvent. The primary imaging member 60 should also contain a suitable charge agent, as are known in the literature, so that the electrical resistivity of said member lies between $10^{10}$ Ω-cm and $10^{6}$ Ω-cm. The primary imaging member 60 can also include a thin coating or layer of a material to control adhesion, such as a fluorinated hydrocarbon, including Teflon, various silicones, or salts of fatty acids such as zinc stearate, for example. The primary imaging member 60 can also have a thin layer (less than 50 μm thick) of a relatively hard material (i.e. a material having a Young's modulus greater than $10^{8}$ Pa). Suitable materials include various ceramers, leathery or glass polymers, or refractory materials such as diamond-like carbon, SiC, $SiO_2$, for example. When practicing this mode of the invention, the applied voltage used to generate the aforementioned electrostatic field between the compliant material of the primary imaging member 60 and metallic back-up pressure roller 50 should be greater than 300 volts and less than 3,000 volts. It is preferable that, in this embodiment of the invention, the primary imaging member 60 has a compliant layer not less than 0.1 mm thick and preferably at least 1.0 mm thick. This layer should have a Young's modulus of between 1.0 MPa and 10.0 MPa, as determined by measuring the stress-strain curve in tension, using a device such as an Instron Tensile Tester and extrapolating back to zero strain. It is also preferable that this same layer has a Poisson's ratio between 0.4 and 0.5. When practicing this mode of the invention, it is desirable that the uniform series of cells be arranged in a pattern having a periodicity corresponding between 30 and 400 lpi, although a higher periodicity (i.e. greater than 400 lpi) may be suitable for certain applications.

Figure 4:
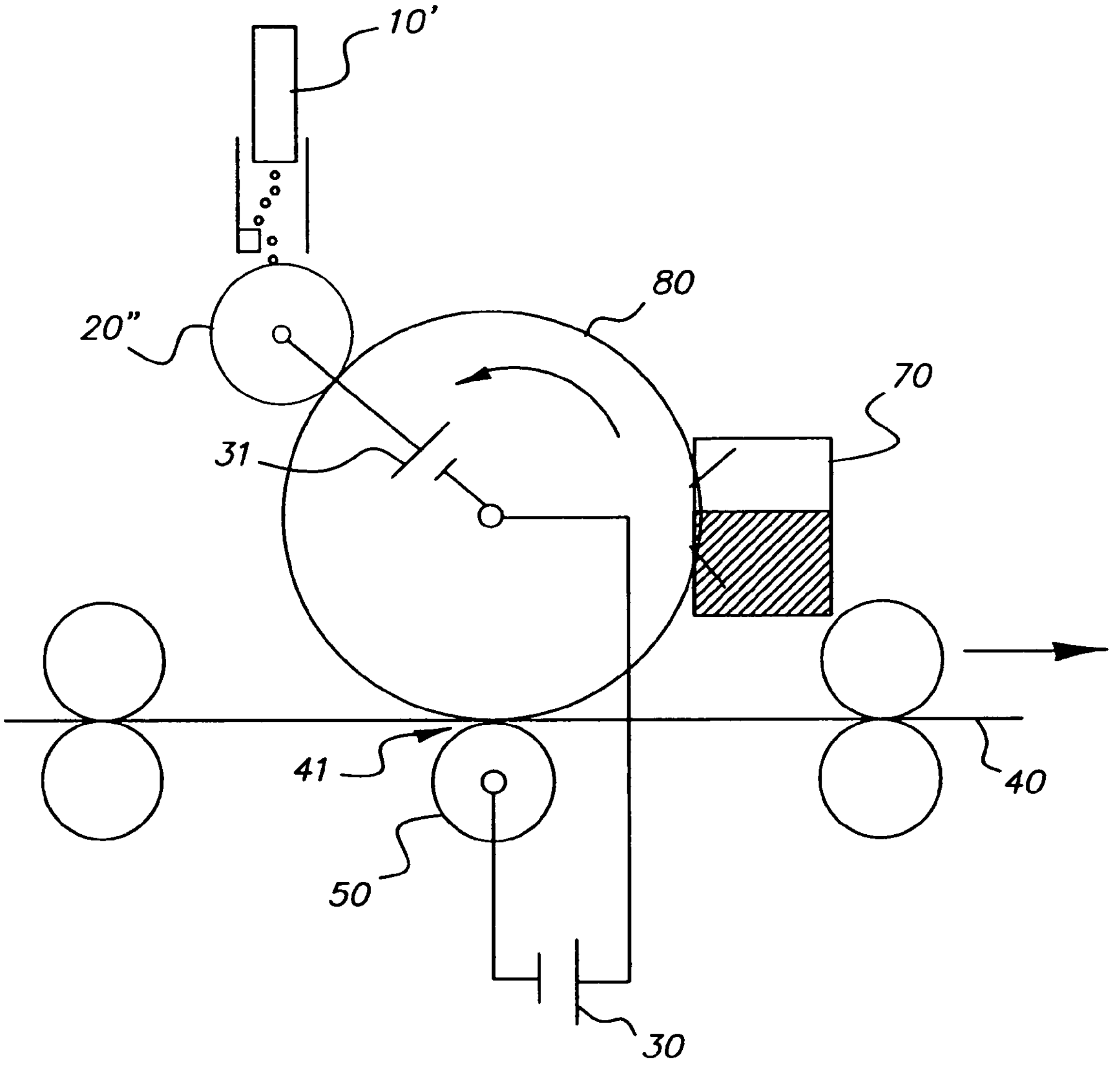
FIG. 4 is a schematic view of another embodiment of the printing apparatus according to this invention including an ink jet device, a metallic celled roller, an intermediate transfer member and biased transfer to a receiver.

In yet another preferred mode of operation of this invention, the image is not transferred directly from the primary imaging member 60 to the receiver 40. Rather, as shown in FIG. 4, the image is first formed on the primary imaging member 20" by an ink jet printhead 10', transferred to an intermediate member 80 by contacting the intermediate member 80 to the primary imaging member 20" and applying an electrostatic field from source 31 that urges the marking particles to transfer from the primary imaging member 20" to the intermediate member 80. The intermediate member 80 is in the form of a roller, however, the intermediate can also be in the form of a web. Subsequently, the image is transferred from the intermediate member 80 to the receiver 40.

Although this can be done upon application of just pressure between the intermediate member 80 and the receiver, it is preferable to apply an electric field from source 30 to intermediate member 80 and back-up pressure roller 50 that urges the charged marking particles from the intermediate member to the receiver. Other means of transfer from the intermediate member to the final image receiver (e.g., paper) can be done using thermal or thermal assisted transfer, as are known in the electrophotographic literature. As suggested, it is preferable that the intermediate member 80, include an elastomeric material, i.e. one having the same mechanical and electrical properties as detailed above. Such a material is preferable because: 1) it can protrude into a cell partially filled with ink and allow that ink to transfer, as will be discussed forthwith; 2) it can expand under the pressure associated with transfer and allow a controllable amount of dot gain to occur, which allows the printing of high density regions; and 3) it conforms to the surface roughness of many receivers, ensuring more uniform transfer.

The surface of the intermediate member 80 can include a material that controls the adhesion of the marking particles to the intermediate member. Examples of such adhesion-controlling materials include, but are not limited to Teflon, zinc stearate, various ceramers, or sol-gels, for example.

It is preferable that the intermediate member 80 have a compliant layer not less than 0.1 mm thick and preferably at least 1.0 mm thick. This layer should have a Young's modulus of between 1.0 MPa and 10.0 MPa, as determined by measuring the stress-strain curve in tension using a device such as an Instron Tensile Tester and extrapolating back to zero strain. Suitable materials include various polyurethanes, silicones, or rubbers, for example. The material chosen should not be significantly swellable or softenable in the solvent used in the ink. Such a material is preferable because: 1) it can protrude into a cell partially filled with ink and allow that ink to transfer, as will be discussed forthwith; 2) can expand under the pressure associated with transfer and allow a controllable amount of dot gain to occur that allows the printing of high density regions; and 3) it conforms to the surface roughness of many receivers, ensuring more uniform transfer. It is further preferable, that the material, have a Poisson ratio of between 0.4 and 0.5. This would further facilitate the ability to have a controllable dot gain.

Figure 5:
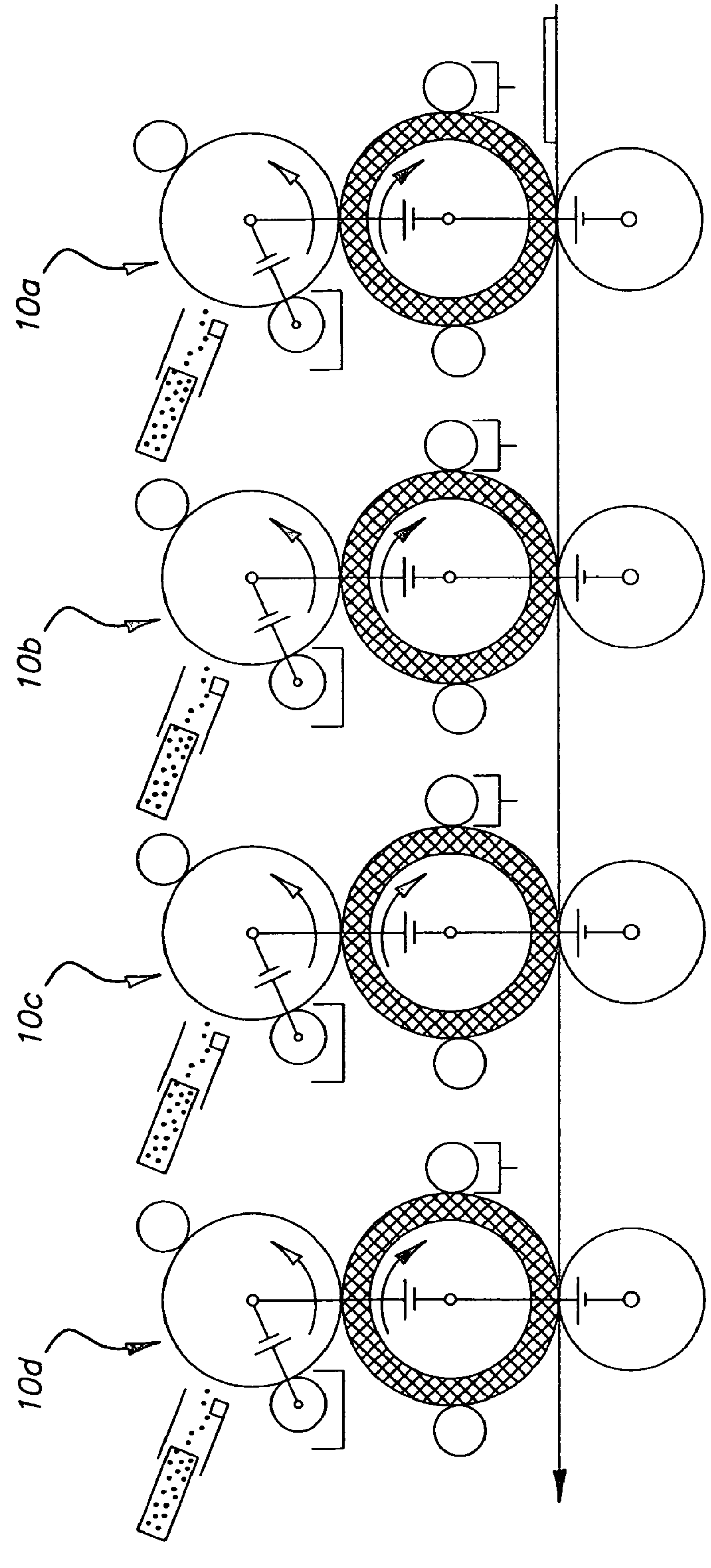
FIG. 5 is a schematic view of a multi-color printing apparatus utilizing a plurality of printing apparatus modules, as shown in FIG. 4, according to this invention.

A multicolor printing apparatus, as shown in FIG. 5, includes a plurality of printing apparatus modules **10*a*-10*d* (such modules being as individually shown in FIG. 4), with each module having a respective ink of a different color or other characteristic (e.g., providing a colorless protective coating or a particular gloss). Of course, the multicolor printing apparatus could suitably include the printing apparatus modules of FIGS. 1 or 3**. As such, the final image printed on the receiver can be full, or partial, multicolor, and can have a controlled gloss or protective coating.

In a typical printed receiver, image density, or gray scale, can be controlled by forming area-modulated dots into a regular screen pattern at, for example, 150 dots per inch. This is frequently referred to as a 150-line rule. This is obviously not feasible in a system in which a single primary imaging member must be able to print a variety of documents, as is presently the case. Rather, as discussed previously in this disclosure, the cells (series of substrate 20 of primary imaging member 60 in FIGS. 1 and 2) are uniform in size and periodic in position. It should be noted that, in the practice of this invention, gray scale is achieved by varying the amount of ink in each cell, in addition to filling only some of the cells. Thus, the amount of ink jetted into a given cell can vary continuously between no ink and a totally filled cell. In effect, the quantity of ink is selectively jetted into each cell.

When printing into a cellular structure, it is important to be able to allow the ink drops to spread in a controllable manner on the receiver in order to be able to totally cover the receiver and produce high-density prints. This spread is often referred to as "dot gain", and the dots ultimately printed on the receiver are larger than those initially jetted into the cells on the primary imaging member. The ability to control dot gain is important since too little dot gain would not allow the ink to totally cover the receiver, thereby allowing un-inked portions of the receiver to show through and limiting the density of the print; and too much dot gain can result in a loss of sharpness as edges become blurred. Moreover, the ability to accurately render low-density images would be compromised, as the ink would spread too much.

When using electrostatic transfer, the inks should include electrically charged marking particles such as those described in the aforementioned co-pending U.S. patent application. Moreover, the ink should be electrically insulating, i.e., it should have an electrical resistivity greater than $10^{10}$ Ω-cm, and preferably greater than $10^{12}$ Ω-cm, as determined using the method described in the same co-pending U.S. patent application.

In order to enhance transfer of ink from partially filled cells, a preferred embodiment of this invention includes the use of a uniformally patterned series of cells on a compliant substrate 20 fitted to a rigid support cylinder as shown in FIG. 1. The quantity of ink jetted into each cell can be varied to control the density of the image to be printed. As the compliant substrate 20 is compressed in the transfer nip where the image is transferred to the receiver, the ink will be expelled from even the partially filled cells to achieve the desired level of image quality as expressed in gray levels. Those skilled in the art will recognize that the cell wall thickness and the durometer of the compliant substrate 20, as well as the pressure applied in the transfer nip, will be optimized to realize the target level of dot gain, transfer efficiency and ultimate image quality.

The surface energy of the compliant substrate 20 may also be optimized to enhance the release of ink from the cell, both during transfer to the receiver and in the subsequent cleaning step. Many surface modification techniques exist such as plasma treatment to attached chemical moieties that modify the surface energy.

When being used with an electrostatic transfer assist, the patterned primary imaging member 60 should include an electrically conducting layer, such as a metal cylinder or sleeve, beneath the compliant member so as to allow the roller to be electrically biased. The elastomer should also be electrically conducting and have a resistivity less than $10^{11}$ Ω-cm, preferably less than $10^{9}$ Ω-cm, and more preferably less than $10^{6}$ Ω-cm. This can be achieved by suitably doping the elastomer with appropriate charge transport agents commonly used in electrostatic transfer rollers in electrophotographic engines. Moreover, the receiver should also be backed in a manner suitable to establish an electric field. For example, the receiver could be pressed against the primary imaging member 60 using an electrically grounded metal roller 50. The metal member of the compliant primary imaging member could then be electrically biased by connecting the metal member to a suitable voltage source (e.g., source 30), thereby establishing an electric field across the primary imaging member 60 and receiver 40. The polarity of the voltage is chosen to drive the marking particles towards the receiver. Other electrical configurations that give similar applied electrical fields, as known in the literature, are also suitable for use with this invention.

The back-up pressure roller 50 can also include other components such as a thin ceramic layer or wet-ability or adhesion controlling films such as Teflon, for example, provided such layers are sufficiently thin so as to allow a transfer field to be formed. The properties of the other components are known in the electrophotographic art and can be directly implemented from that art.

The invention has been described in detail with particular reference to certain preferred embodiments thereof, but it will be understood that variations and modifications can be effected within the spirit and scope of the invention.

PARTS LIST

10 Ink jet printhead
10*a*-10*d* Printing apparatus modules
20, 20', 20" Uniformly patterned surface
30 Voltage source
31 Voltage source
40 Receiver
41 Receiver nip
50 Roller
60 Primary imaging member
70 Cleaning subsystem
80 Intermediate member

What is claimed is:

1. A printing apparatus for printing an image-wise ink pattern on a receiver, said printing apparatus comprising:
- a primary imaging member including a series of substantially equal-sized cells located over the substrate surface of said primary imaging member, said primary imaging member having an electrically conductive layer, each cell having a size;
- an ink jet printhead that selectively ejects drops of ink into said cells of said primary imaging member in a desired image-wise ink pattern, the ink including marking particles suspended in an electrically insulating liquid solvent, each marking particle having a size, the size of each cell being greater than the size of each marking particle;
- a mechanism for fractionating such image-wise ink on said primary imaging member to separate liquid solvent from marking particles in the ink;
- a transport device for transporting a receiver into operative association with said primary imaging member; and
- a transfer mechanism for applying pressure between said receiver and said primary imaging member, while said receiver member is in operative association with said primary imaging member, and establishing an electrostatic field to transfer an image-wise ink pattern to such receiver, the image-wise ink pattern including the fractionated marking particles of the image-wise ink, wherein the establishment of the electrostatic field causes the marking particles to be urged away from the primary imaging member while leaving at least some of the liquid solvent on the primary imaging member.

2. A printing apparatus according to claim 1 wherein said primary imaging member is noncompliant.

3. A printing apparatus according to claim 2 wherein said cells have a frequency between 140 and 1,200 lpi.

4. A printing apparatus according to claim 2 wherein said cells have frequency between 400 and 800 lpi.

5. A printing apparatus according to claim 2 wherein said primary imaging member includes a low surface energy overcoat.

6. A printing apparatus according to claim 1 wherein said electrically conductive layer of said primary imaging member includes a material with a high electrical conductivity.

7. A printing apparatus according to claim 6 whereby the electrostatic field is established across said receiver by creating a difference of potential between 100 and 1,000 volts.

8. A printing apparatus according to claim 1 wherein said primary imaging member is compliant.

9. A printing apparatus according to claim 8 wherein said compliant primary imaging member has a resistivity less than $10^{10}$ Ω-cm.

10. A printing apparatus according to claim 8 wherein said compliant primary imaging member has a resistivity less than $10^{10}$ Ω-cm.

11. A printing apparatus according to claim 8 wherein said cells have a periodicity between 30 and 400 lpi.

12. A printing apparatus according to claim 8 whereby the electrostatic field between said compliant primary imaging member is established by applying a difference of potential of between 300 and 3,000 volts.

13. The printing apparatus of claim 8 wherein said equal-sized cells of said primary imaging are formed of a compliant material.

14. The printing apparatus of Claim 8 wherein said primary imaging member includes a compliant sleeve mounted on a rigid support member beneath said equal-sized cells.

15. The printing apparatus of claim 1 wherein said primary imaging member is a roller with said equal-sized cells located substantially over the entire circumferential surface of said roller.

16. The printing apparatus of claim 15 wherein said equal-sized cells of said primary imaging member are of a size so as to enable a transferred image-wise ink pattern to have a high resolution.

17. The printing apparatus of claim 1 further including an intermediate member between said primary imaging member and a receiver, said intermediate member receiving an image-wise ink pattern from said primary imaging member and subsequently transferring said image-wise pattern to a receiver under the influence of said transfer mechanism.

18. A printing apparatus according to claim 17 wherein said intermediate member is compliant.

19. A printing apparatus according to claim 17 wherein an image-wise ink pattern is thermally transferred from said intermediate member to said receiver.

20. An apparatus according to claim 1, further including a plurality of modules, each module having a primary imaging member including a series of substantially equal-sized cells, an ink jet printhead capable of image-wise jetting ink into said equal-sized cells of said primary imaging member, a mechanism for fractionating such image-wise ink on said primary imaging member to separate liquid solvent in the ink, a receiver onto which such image-wise ink is transferred from said primary imaging member, and a transfer member forming a nip with the receiver for transferring a liquid-depleted image-wise ink to such receiver.

21. An apparatus according to claim 1, further including a plurality of modules, each module having a primary imaging member including a series of substantially equal-sized cells, an ink jet printhead capable of image-wise jetting ink into said equal-sized cells of said primary imaging member, a mechanism for fractionating such image-wise ink on said primary imaging member to separate liquid solvent in the ink, an intermediate member for receiving such image-wise ink from said primary member, a receiver onto which such image-wise ink is transferred from said primary imaging member, and a transfer member forming a nip with the receiver for transferring a liquid-depleted image-wise ink to such receiver.

22. A process for printing an ink image comprising:

jetting an electrically insulating ink into substantially equal-sized cells located over the surface of an electrically conductive primary image member in a desired image-wise ink pattern, the ink including marking particles in a liquid, each marking particle having a size, each cell having a size, the size of each cell being greater than the size of each marking particle;

fractionating the image-wise ink to separate liquid from the marking particles thereof; and transferring the fractionated marking particles of the image-wise ink pattern to a receiver upon application of pressure and an electrostatic field applied between the primary imaging member and the receiver, wherein applying the electrostatic field causes the marking particles to be urged away from the primary imaging member while leaving at least some of the liquid solvent on the primary imaging member.

23. A process according to claim 22 wherein the quantity of ink jetted into each cell is varied to control density of image to be printed.

* * * * *